United States Patent [19]

Vassiliadis

[11] 4,275,964

[45] Jun. 30, 1981

[54] APPARATUS AND METHOD FOR DETERMINING THE REFRACTIVE CHARACTERISTICS OF A TEST LENS

[75] Inventor: Arthur Vassiliadis, Mountain View, Calif.

[73] Assignee: Rodenstock Instruments Corporation, Sunnyvale, Calif.

[21] Appl. No.: 40,139

[22] Filed: May 18, 1979

[51] Int. Cl.³ .............................................. G01B 9/00
[52] U.S. Cl. .................................... 356/125; 356/127
[58] Field of Search ................ 356/124, 125, 127, 126

[56] References Cited

U.S. PATENT DOCUMENTS

| | | | |
|---|---|---|---|
| 2,803,995 | 8/1957 | Gunter et al. | 356/127 |
| 3,832,066 | 8/1974 | Cornsweet | 356/127 |
| 3,870,415 | 3/1975 | Cornsweet | 356/124 |
| 3,877,788 | 4/1975 | Sprague et al. | 356/124 |
| 3,880,525 | 4/1975 | Johnson | 356/127 |
| 3,981,589 | 9/1976 | Spitzberg | 356/127 |
| 4,007,990 | 2/1977 | McDevitt et al. | 356/124 |
| 4,070,115 | 1/1978 | Humphrey | 356/125 |
| 4,090,790 | 5/1978 | Dragon et al. | 356/125 |
| 4,102,575 | 7/1978 | Lapornik et al. | 356/125 |
| 4,130,361 | 12/1978 | Humphrey | 356/125 |
| 4,139,305 | 2/1979 | Lapornik | 356/125 |

FOREIGN PATENT DOCUMENTS 2432502  7/1977  Fed. Rep. of Germany .

Primary Examiner—Richard Rosenberg
Attorney, Agent, or Firm—Phillips, Moore, Weissenberger, Lempio & Majestic

[57] ABSTRACT

An automatic lensmeter (48) for determining the refractive properties of a test lens (76) including optics (52, 58, 62, 64, 68, 70, 72, 74) for producing a collimated, nonrotational beam of light, equally disposed about and propagating along an optical axis (50), which is refracted by the test lens (76), a nonrotational mask (18) having an annulus (24) for generating a stationary elliptical loop (28) of light at a detecting plane (26), the loop (28) having a shape, size and location dependent on the refractive properties of the test lens (76), and a photodetector (31) at the plane (26) to intercept the loop 28. The lensmeter (48) has no moving optical components and, due to the loop 28, provides an infinite number of points to determine very accurately one or more of the refractive properties, thereby overcoming problems with prior automatic lensmeters having relatively rotational optics and/or providing a finite number of points at a detecting plane.

28 Claims, 11 Drawing Figures

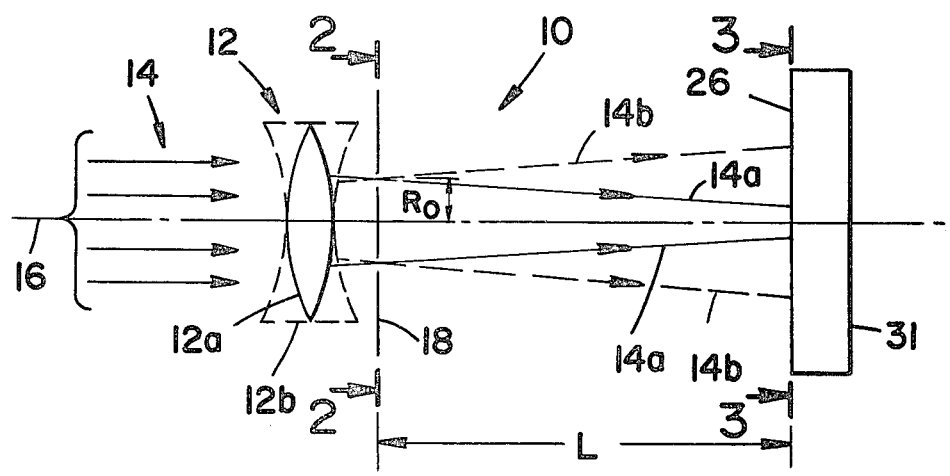
FIG_1
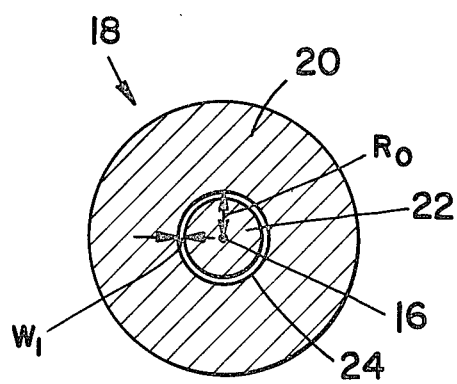
FIG_2
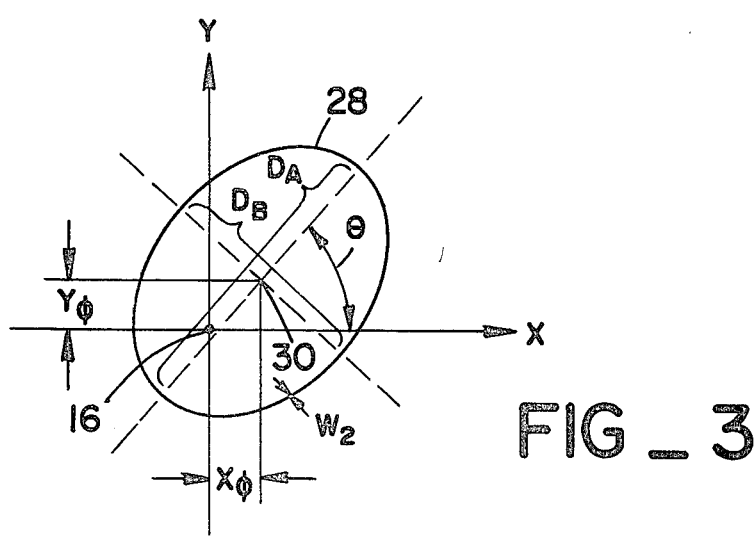
FIG_3

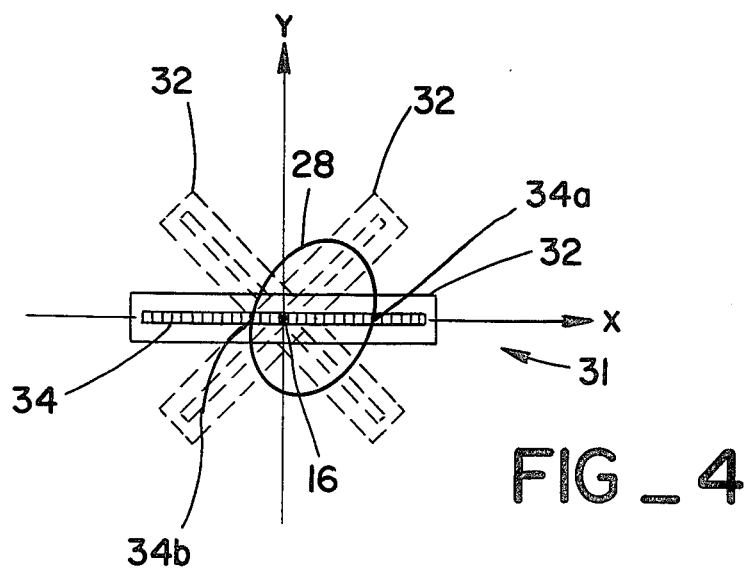
FIG_4
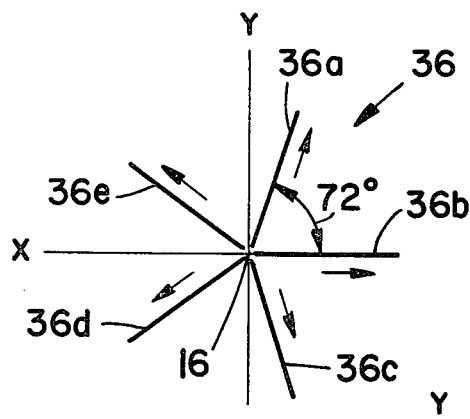
FIG_5
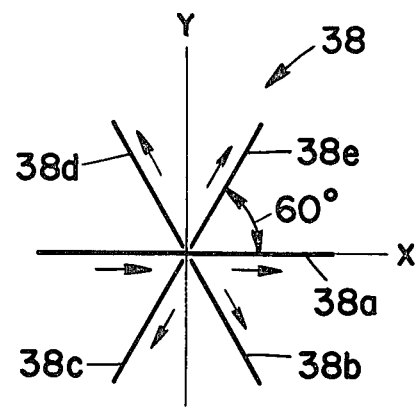
FIG_6
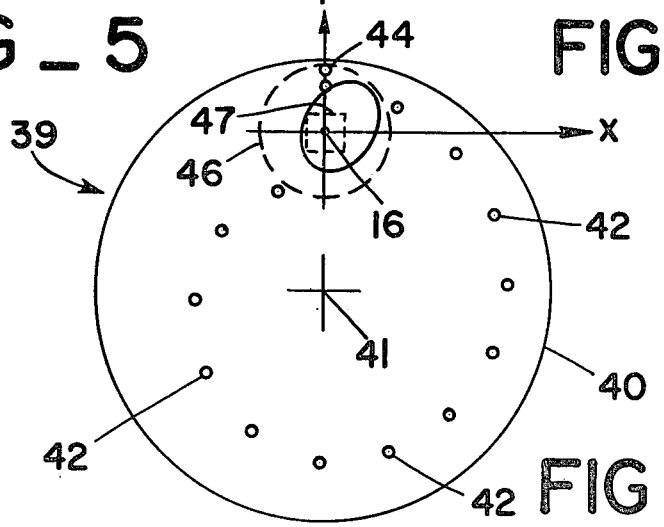
FIG_7

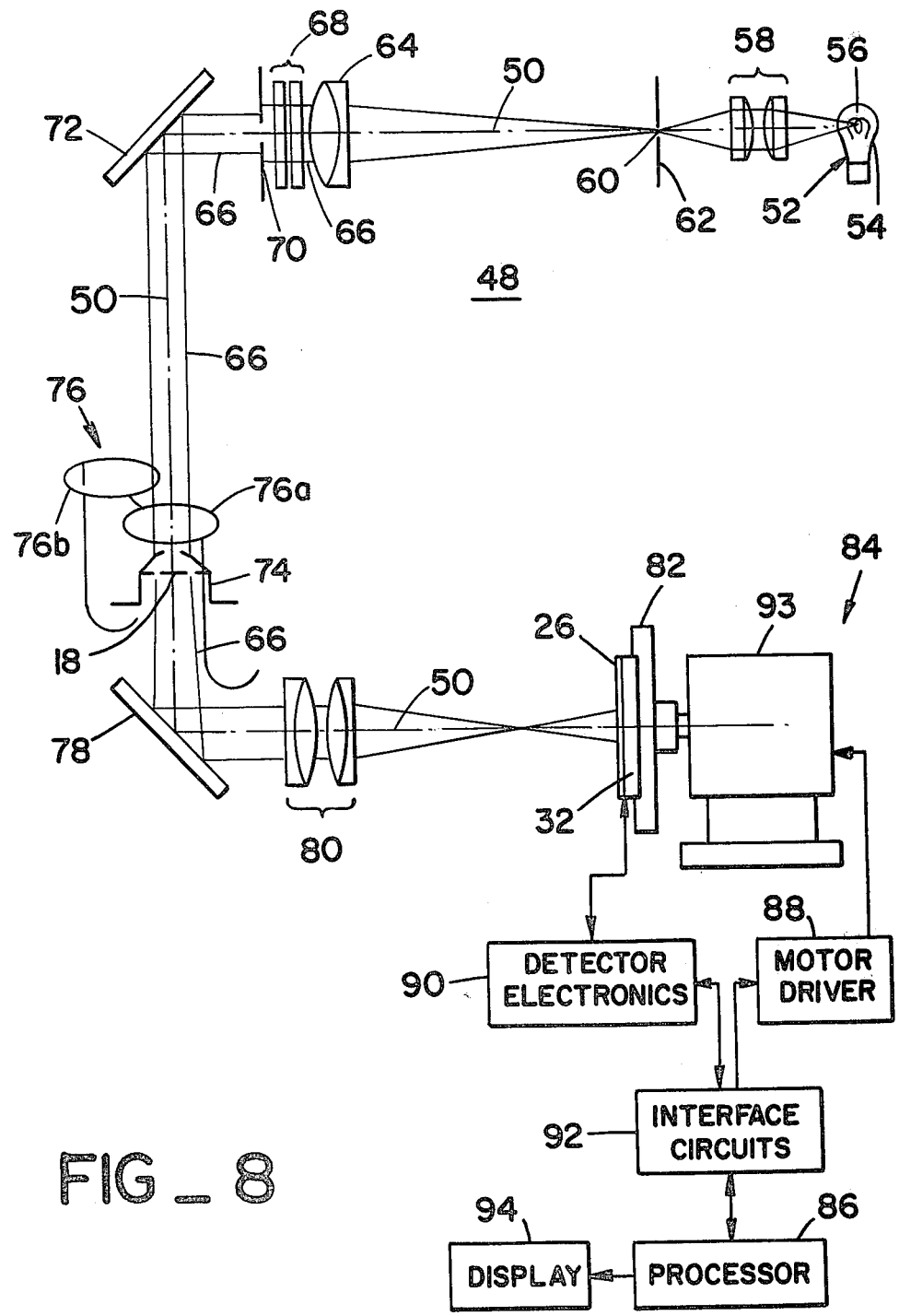
FIG_8

APPARATUS AND METHOD FOR DETERMINING THE REFRACTIVE CHARACTERISTICS OF A TEST LENS

DESCRIPTION

1. Technical Field

The present invention relates to an apparatus and method for determining the optical characteristics of lenses and, more particularly, to an apparatus and method for determining the refractive properties of lenses such as spherical power, cylindrical power, cylinder axis, prism power and prism axis.

2. Background Art

A large portion of the world population eventually wears spectacles, ophthalmic lenses or contact lenses. Thus, annually, millions of lenses, either newly manufactured or old, must be accurately measured to assure that the intended correction to the vision of the lens wearer is satisfactory. To meet this requirement, apparatus known as lensmeters have been developed to determine the refractive properties of the lenses being measured.

In recent years a variety of lensmeters has been developed which operate substantially automatically to determine such refractive properties. These automatic lensmeters generally have the advantage of eliminating the subjective judgment of an operator using a conventional manual lensmeter and thereby making the measurement more objective. The automatic lensmeters also generally have the advantage of more rapidly determining the refractive properties of the lenses and of being more accurate over the manual lensmeters. However, the prior automatic lensmeters each have one or more disadvantages as will now be described.

One type of automatic lensmeter utilizes relatively moving optical parts of an optical system to determine the refractive properties of a lens under test. For example, in one embodiment of this type of lensmeter a narrow beam of light is caused to scan or rotate about the optical axis of the lensmeter and be propagated through the test lens. This rotating beam, which is refracted by the test lens, is then propogated to a detecting plane where the refracted light beam moves or rotates correspondingly about the optical axis. A position sensitive detector and electronic circuitry then detect the rotating refractive beam at the detecting plane and process this optical information to produce data indicating the refractive properties of the test lens.

A disadvantage with such prior automatic lensmeters is that they require the relatively movable optics for producing the optical information at the detecting plane needed to determine the refractive characteristics of the test lens. This requires the precise scanning of a light beam which, in turn, means that normally only a laser can be used as a light source for generating the required narrow light beam. Moreover, in order to process the optical information at the detecting plane, the electronic circuitry must be accurately synchronized with the rotation of the scanning beam and the position sensitive detector has to be very carefully calibrated.

Other types of automatic lensmeters generally have the advantage of not requiring relatively movable optical components to determine the refractive properties of the test lens. In one of these types of lensmeters, a collimated beam is propagated through the test lens which refracts the beam. The refracted beam is then propagated to a mask which has pinholes to transmit selected refracted rays of the beam to a subsequent detecting plane at which points of refracted light are detected. Another of these types of lensmeters, based on retroreflecting concepts, also uses a mask having pinholes to transmit selected refracted rays and this system is described as being without relatively moving optical components; however, the mask does have to be moved to at least two positions to provide optical information for determining the refractive properties of the test lens.

One disadvantage with the above other type of lensmeter is that only a finite number of points of light are available at the detecting plane. This limited number of points could mean that insufficient optical information is available to determine accurately the refractive properties of the test lens. For example, the test lens itself may have perturbations or inhomogeneities at the localized area represented by the light point on the detecting plane, thereby not providing accurate information. Alternatively, the pinholes on the mask may have some minute foreign particles that could affect or offset the propagation of the refracted beam to the detecting plane.

Furthermore, the one lensmeter mentioned above of the other type would require use of a very expensive two dimensional array of detectors or an expensive and carefully calibrated TV camera in order to accurately locate the individual rays of light generated by the pinholes. Still furthermore, the prior lensmeter utilizing the retroreflecting concepts is a more complex optical system than other lensmeters.

SUMMARY OF THE INVENTION

The present invention is directed to overcoming one or more of the disadvantages as set forth above.

In accordance with one aspect of the present invention, apparatus is provided for determining the refractive properties of a test lens, comprising means for producing a beam of light about a central axis and directing the beam through a test lens to refract the beam, means for generating a stationary loop of light from the refracted beam, the loop having a shape, size and location dependent on the refractive properties of the test lens, and means for detecting the loop of light at a plane.

In another aspect of the present invention, a method is provided for determining the refractive properties of a test lens, comprising generating a nonrotational collimated beam of light surrounding a central axis, propagating the beam of light through the test lens to refract the light beam, forming a stationary loop of light from the refracted beam at a plane, and detecting the loop of light at the plane.

The present invention solves the problems of the prior art which require rotatable optics and/or have available only a finite number of points at a detecting plane. With the present invention no movable optics are needed and a stationary loop of refracted light having an infinite number of points is produced at the detecting plane to provide maximum optical information for determining the refractive properties of the test lens. A linear photodiode array can be used to detect any number of points of light of the loop.

BRIEF DESCRIPTION OF THE DRAWINGS

FIG. 1 is a schematic illustration of one embodiment of the present invention.

FIG. 2 is a view taken along lines 2—2 of FIG. 1.

FIG. 3 is a view taken along lines 3—3 of FIG. 1.

FIG. 4 is a view of one embodiment of a detector taken along lines 3—3 of FIG. 1.

FIG. 5 is an illustration of another embodiment of a detector taken along lines 3—3 of FIG. 1.

FIG. 6 is a view of yet another embodiment of a detector taken along lines 3—3 of FIG. 1.

FIG. 7 shows still further another embodiment of a detector taken along lines 3—3 of FIG. 1.

FIG. 8 shows, schematically, a practical embodiment of the present invention.

BEST MODE OF CARRYING OUT THE INVENTION

Figure 9:
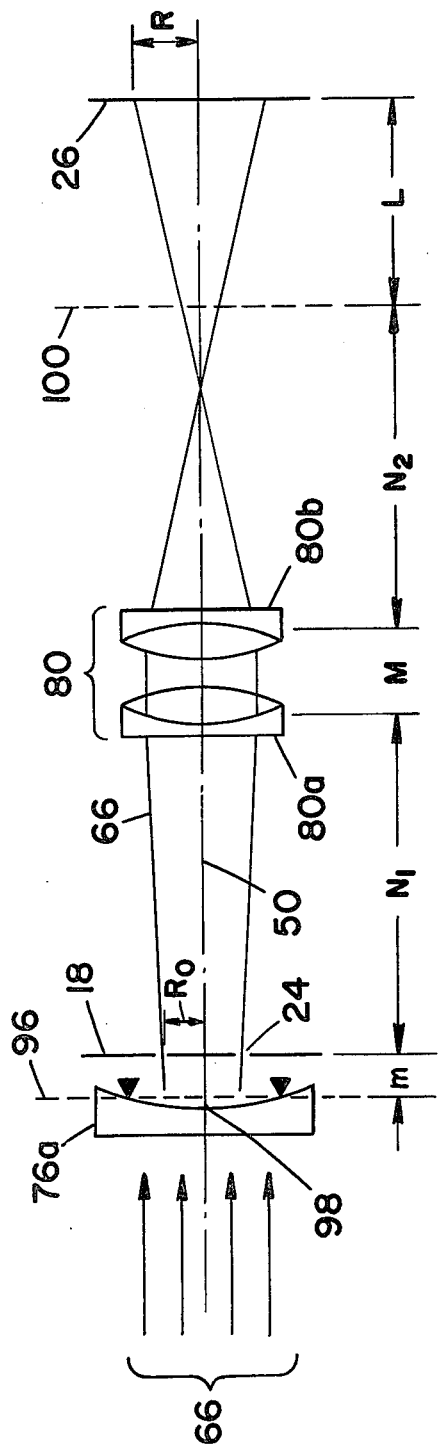
FIG. 9 is a diagram showing, essentially, the geometry of the embodiment of FIG. 8.

FIG. 1 shows a simple optical system 10 of the present invention. A lens 12, whose refractive properties are to be determined or tested, is positioned in the path of a collimated light beam 14. The test lens 12 can be a positive lens 12a shown by the solid lines or a negative lens 12b shown by the dotted lines. The beam 14 is nonrotatable and constitutes a plurality of rays equally disposed about and propagating along the central or optical axis 16 of the system 10. The source for the beam 14 can be a conventional light source, such as an incandescent lamp, or a laser.

A mask 18, shown in more detail in FIG. 2, is positioned subsequent or posteriorly of the test lens 12. Mask 18 has an opaque section 20 and an opaque section 22 with a circular annulus 24 of transparent material between the sections 20 and 22. The annulus 24 has a width $W_1$ and has a radius $R_o$. Mask 18 transmits only those rays from the test lens 12 which are refracted by the test lens 12 through the annulus 24 at $R_o$. Mask 18 can be a flat glass plate with sections 20 and 22 being black or metallic. As shown in FIG. 1, for a positive lens 12a, refracted beam 14a will be converging, while for negative lens 12b refracted beam 14b will be diverging.

The refracted beam 14a or 14b is propagated to a detecting plane 26. As shown in FIG. 3, at the detecting plane 26, a stationary loop 28 of light is produced from the beam 14a or 14b. The loop 28 is, generally, an ellipse having a shape, size and location that is dependent on the refractive properties of the test lens 12. The specific loop 28 shown is elliptical, which indicates that the test lens 12 is a sphero cylindrical lens. If the loop 28 of light were circular, then the test lens 12 would be only spherical. Thus, the shape of the loop 28 is dependent on the refractive properties of the test lens 12. Also, if the test lens 12 is a positive lens 12a or a negative lens 12b, then the diameter of the loop 28 will be smaller or greater, respectively, whereby the size of the loop 28 depends on the refractive properties of the test lens 12. Furthermore, if the test lens 12 has prism power, the center 30 of the loop 28 will be offset from the central axis 16 so that the location of the loop 28 in relation to the axis 16 is dependent on the refractive properties of the test lens 12. As also shown in FIG. 3, the loop 28 has a width $W_2$. Thus, at the detecting plane 26 a stationary loop 28 of light is provided, having an infinite number of light points, that gives information for determining the refractive properties of the test lens 12, as will be described below.

With reference to FIG. 1, a light detector 31 is positioned at the detecting plane 26 to sense the stationary loop 28. Various embodiments of the detector 31 will be described later.

The mask 18, and particularly the circular annulus 24, can be selected with the following considerations. The annulus 24 through which the beam 14a or 14b passes can be considered to be a narrow slit. Consequently, this slit or annulus 24 will generate a complex diffraction pattern at the detecting plane 26 which is due to the wave nature or aspect of light. If the width $W_1$ of the annulus 24 is very narrow, the width $W_2$ of the loop 28 will be broad. If the width $W_1$ of the annulus 24 is broad, width $W_2$ of the loop 28 again will be broad, comparable to the width $W_1$. At the intermediate widths $W_1$ of the annulus 24, there is a range of loops 28 of narrower widths $W_2$ that can be obtained, and there is one width $W_1$ that will produce the narrowest width $W_2$ of loop 28 at the detecting plane 26. The light distribution at the detecting plane 26 will have a dominant maximum peak shown by loop 28 with some very weak sidebands (not shown). Specific dimensions for the annulus 24 will be given when discussing a practical embodiment of the invention.

More particularly, a good approximation of the light distribution at the plane 26 due to the circular annulus 24 can be obtained by considering the distribution of the light from a straight slit whose width is the same as the width $W_1$ of the annulus 24. To this end, use can be made of the well-known solutions of diffraction by an edge and by a single slit involving Fresnel integrals. As would be known to those skilled in the art, use can be made of tabulated values of the Fresnel integrals or of Cornu's spiral whose coordinates are expressed by the Fresnel integrals. Use of Cornu's spiral provides an easy method of obtaining the Fresnel diffraction from a single slit and this provides adequate accuracy for determining the diffraction from the annulus 24.

FIG. 1 shows a distance L between the mask 18 and the detecting plane 26. This distance L preferably should be made smaller than the smallest positive focal length of the test lenses 12 that are to be measured. If the detecting plane 26 were at a distance L greater than the focal length of the test lenses 12, then a light ambiguity problem would occur at the detecting plane 26 in forming the loop 28, as would be appreciated by those skilled in the art. Also, for certain focal lengths the radius of the loop 28 would be too small for taking practical measurements, as also would be appreciated by those skilled in the art.

FIG. 4 shows one embodiment of photodetector 31 for detecting the loop 28 at the plane 26. The detector 31 constitutes a linear photodiode array 32 having a plurality of photodiodes 34, for example, 1024 that can be scanned. These photodiodes are very accurate in their spatial dimensions, i.e., their size and spacing, and thereby provide accurate measurements of the physical location of light that is incident on the array 32 without further calibration. The array 32 is centered on and rotatable about the central axis 16. Thus, the array 32 can be rotated to a plurality of positions, one of which is shown in full lines and two others of which are shown by the dotted lines of the array 32.

If the elliptical loop 28 intersects the plane 26 as shown in FIG. 4, then diodes 34 in the areas 34a and 34b of the array 32 would detect two or a pair of points on the loop 28. Consequently, as will be further described, when the array 32 is scanned, two voltage peaks would be obtained from the diodes 34 in the areas 34a and 34b. These voltage peaks thus represent two points on the ellipse 28 whose characteristics are utilized to calculate the refractive properties of the test lens 12.

By rotating the array 32 to another angular position shown in FIG. 4, and scanning the array 32, two more voltage peaks can be obtained from other diodes 34 of the array 32 that are intersected by the ellipse 28. Again, by rotating the array 32 to another angular position, and again scanning, two more voltage peaks can be obtained from the diodes 34 of the array 32 that are crossed by the ellipse 28. Thus, a total of six voltage peaks representing six points on the ellipse 28 can be obtained by positioning the array 32 at three angular positions and scanning the array 32.

The ellipse 28 provides optical information indicating the refractive properties of the test lens 12 for the following reasons. As shown in FIG. 3, the ellipse 28 has a major axis of length $D_A$ and a minor axis of length $D_B$. As one example, the major axis $D_A$ is proportional to the spherical power of the test lens 12, while the absolute difference between $D_A$ and $D_B$ is proportional to the cylindrical power of the lens 12. The angle $\theta$ of the major axis $D_A$ is the cylinder axis. The center 30 of the ellipse 28, defined by the distances $X\phi$ and $Y\phi$, is proportional to prism power and defines the prism axis. In the case of a test lens 12 having only spherical power, the loop 28 will be a circle with diameter $D=D_A=D_B$ and no angle $\theta$ involved.

The five equations for calculating the five unknowns $D_A$, $D_B$, $\theta$, $X\phi$ and $Y\phi$ are well-known. Therefore, by detecting only five points of the loop 28, sufficient data are available to solve these equations. The required calculations can be made electronically, using the above voltage peaks representing the points on the loop 28.

As has just been mentioned, data representing only five points of the ellipse 28 are necessary to determine or test for all the refractive properties of the test lens 12. The advantage, though, of having the stationary loop 28 at the detecting plane 26 is that additional optical information is available for determining more accurately such properties. For example, six points on the ellipse 28 are detected by moving the detector 32 through three angular positions. If the array 32 is moved through, for example, ten angular positions at 18° apart, then 20 points on the ellipse 28 can be detected. Then, by using five widely spaced points on the ellipse 28 at a time, four separate and independent calculations can be made to verify the refractive properties of the test lens 12. Furthermore, if still additional readings are taken at, for example, 200 angular positions of the array 32 at 1.8 degrees apart, then any one calculation of the refractive properties of the lens 12 that does not conform to other calculations would indicate possibly that the lens 12 has a perturbation or inhomogeneities indicated by the points on the ellipse 28 that produced such one calculation. Consequently, more subtle parameters of the test lens 12 than its refractive properties can be determined.

FIG. 5 illustrates a photodetector 36 that can be used at the detecting plane 26 in lieu of the detector 32. Detector 36 includes five linear diode arrays 36a–36e equiangularly spaced around the plane 26 and each having, for example, 512 diodes. Each array 36a–36e has one end that is in close proximity to the central axis 16. The angular position and length of the arrays of 36a–36e are such that any loop 28 at the plane 26 would intersect these arrays. Consequently, by scanning each array 36a–36e, data representing points on the ellipse 28 can be obtained and used to calculate the refractive properties of the test lens 12. An advantage of the detector 36 is that it need not be rotated, whereby the entire system 10 shown in FIG. 1 would have no moving parts. Linear arrays in addition to arrays 36a–36e could be added to detect more points on the ellipse 28. Each array of the detector 36 could be scanned in sequence commencing with array 36a from its inner to outer ends.

FIG. 6 shows a detector 38 which is yet another embodiment of a detector that can be used at the detecting plane 26. The detector 38 includes one long linear diode array 38a, having, for example, 1024 diodes, and four shorter linear diode arrays 38b–38e, each having 512 diodes. With this embodiment, therefore, in effect there are 6 arms each at an angular separation of 60°. This detector 38 thus would provide information representing six points on the ellipse 28 and would thus provide some redundancy for checking any measurement of the refractive properties of the lens 12. As with the detector 36, the detector 38 need not be rotated so that the entire system 10 of FIG. 1 would have no moving parts.

FIG. 7 illustrates yet another detector 39 that can be used at the plane 26. A disc 40, which is rotatable about its axis 41, has a plurality of holes 42 in a spiral configuration. The disc axis 41 is offset from the central axis 16. The disc 40 also has a detectable mark or hole 44 to produce a synchronization pulse. Immediately positioned behind the disc 40 is a simple lens 46 that collects light and directs the light to a single small photodiode 47.

As the disc rotates, a particular hole 42 will either not intersect the ellipse 28 or it will intersect it once or twice so that no pulses, or one or two pulses of light will be transmitted through the disc 40 on each passage of such hole to the lens 46 and then to photodiode 47. Thus, when the disc 40 is rotated at a constant speed, the time delays between the synchronization pulse generated from the passage of light through the hole 44 and the output pulses from the photodiode 47 will be representative of points on the ellipse 28. Signals representing at least 5 points on the ellipse 28 can therefore be obtained to calculate the refractive properties of the test lens 12.

FIG. 8 illustrates a practical embodiment of a lensmeter 48 of the present invention. The lensmeter 48 has a central or optical axis 50 that corresponds to the central axis 16 of FIG. 1. A light source 52, such as a quartz halogen or glass halogen bulb 54 having a flat, well packed filament 56, provides the light for the lensmeter 48. A pair of lenses 58, in a manner well-known in the art, images the filament 56 at a small round hole 60 of a mask 62. In this manner, the effective light source for the lensmeter 48 is made to be a point source.

The light beam from the point source 60 is collimated by a lens 64 having a long focal length. The collimated light beam, shown generally at 66, which corresponds to beam 14 of FIG. 1, is then propagated through one or more filters 68 which absorbs all wavelengths of light except those in the region of the light spectrum around the standard wavelength for measuring opthalmic lenses. This is because the degree of refraction at any optical surface depends upon the wavelength of the light; consequently, lensmeters, including lensmeter 48, utilize wavelengths close to those which the eye is most sensitive.

After passing through the filters 68, the beam 66 is incident on a limiting iris 70 that reduces the diameter of the beam 66 to a practical size for the lensmeter 48. The diameter of the beam 66 at the output of the iris 70 need not be very much larger than the diameter of the annulus 24 of mask 18 shown in FIG. 1 and, for example, could be approximately twice the diameter of the annulus 24.

A mirror 72 then reflects the beam 66 downwardly from its horizontal path at the output of the iris 70, to continue propagation along axis 50. A horizontal platform or stand 74 is positioned in the path of the vertically directed beam 66 and supports the mask 18 of FIG. 2. FIG. 8 shows spectacles 76, one of whose lenses 76a is supported on the stand 74 and which constitutes the test lens 12 shown in FIG. 1. The stand 74 can support not only the ophthalmic lens 76a, but can also accommodate very thick, high power ophthalmic lenses as well as contact lenses. The vertical direction of the beam 66 from the mirror 72 makes it convenient for placing the lens 76a on a horizontal surface of the platform 74.

After being refracted by the lens 76a and diffracted by the annulus 24 of the mask 18, the beam 66 is reflected by a mirror 78 back to a horizontal direction to provide a practical geometrical configuration of the lensmeter 48 as will be described below. After reflection by the mirror 78, the beam 66 passes through a pair 80 of lenses that projects the loop 28 of light at the detecting plane 26. As described in FIG. 3, the loop 28 will have a shape, size and location that is dependent on the refractive properties of the lens 76a.

At the detecting plane 26, any one of the detectors 32 or 36 or 38 or 39 can be positioned to detect points of light of the loop 28. Preferably, however, the linear diode array 32 is utilized with its 1024 diodes mounted on a printed circuit board 82.

Shown generally in FIG. 8 is an electronic circuit 84 for processing the optical data in the loop 28 at the detecting plane 26. A microprocessor 86 is coupled to a motor driver 88 and a detector electronics circuit 90 through interface circuits 92. Motor driver 88 controls a stepper motor 93 which rotates the array 32 about the central axis 50. The detector electronics 90 scans the array 32 to generate voltage signals representing the points on the loop 28 that cross particular diodes of the array 32 and to transmit these signals back to the processor 86. The processor 86 is programmed to calculate the refractive properties of the test lens 76a from this signal data and to then display the results of the calculations on a display 94 such as a cathode ray tube.

In order to understand the geometry of the lensmeter 48, FIG. 9 shows a diagram of the "working" optics of the lensmeter 48. Like reference numerals are used in FIG. 9 to show like elements in FIG. 8. The pair 80 of lenses constitutes two lenses 80a and 80b. The test lens 76a, when resting on the stand 74, may be considered to be resting on a physical mechanical reference plane 96. The test lens 76a is shown as having a back vertex 98.

The mask 18 is supported by the platform 74 a short distance m from the reference plane 96. The beam 66, after being refracted by the lens 76a and after passing through the annulus 24 of mask 18, is propagated a distance $N_1$ to the lens 80a. After refraction by the lens 80a, the beam 66 is propagated a distance M to the lens 80b. The latter refracts the beam 66 to form an image of the annulus 24 at a plane 100 which is at a distance $N_2$ beyond the lens 80b. The beam 66 then propagates a distance L from the plane 100 to the detecting plane 26.

FIG. 9 also shows the radius $R_o$ of the annulus 24 and the radius R of the loop 28 at the detecting plane 26.

A practical geometry of the lensmeter 48 that provides simple equations and convenient geometry occurs when:

$N_1 = f_1 =$ focal length of lens 80a.
$N_2 = f_2 =$ focal length of lens 80b.
F = focal length of the test lens 76a.
D = 1/F = the strength of the test lens 76a in diopters.

Then, it can be easily shown by simple analysis by one skilled in the art that:

$$\frac{R}{R_o} = \frac{f_2}{f_1} + L\left( \frac{f_1 + f_2 - M}{f_1 f_2} - \frac{f_1}{f_2} \frac{1}{F - m} \right) \quad (1)$$

This equation has the form:

$$R = \frac{K_1 + K_2 D}{1 + K_3 D} \quad (2)$$

Conversely, equation (2) can be written:

$$D = \frac{C_1 + C_2 R}{1 + C_3 R} \quad (3)$$

where $C_1$, $C_2$ and $C_3$ are constants determined by the geometry.

Similarly, it can easily be shown that the prismatic offset $Y\phi$ at the detecting plane 26 can be written as follows:

$$Y\phi = \frac{L f_1}{f_2} \frac{P}{100} \quad (4)$$

or $$P = 100 \frac{f_2}{f_1} \frac{Y\phi}{L} \quad (5)$$

where P is the prism in the test lens 76a in prism diopters. Identical equations (4) and (5) apply for $X\phi$.

As one example, the following parameters are satisfactory:

Lens 80a: $f_1$ = 62.5 mm (F/2.7 triplet lens)
Lens 80b: $f_2$ = 78.0 mm (F/3.4 doublet lens)
m = 3.0 mm
M = 10.0 mm
L = 35 mm Equations 1-5 represent the basis for the calculations to be made by the microprocessor 86 for calculating the refractive properties of the test lens 76a. Mathematical or software corrections should be made if the lens 76a were a high power lens such that the back vertex 98 deviated significantly from the reference plane 96.

Figure 10:
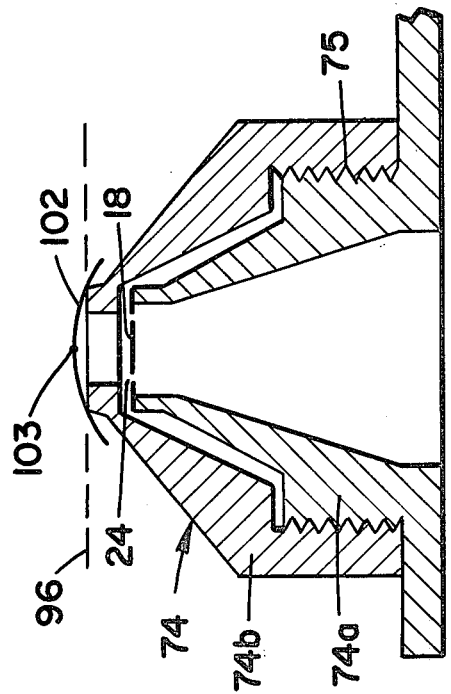
FIG. 10 is a cross section of a component part of the embodiment of FIG. 8.

FIG. 10 shows in more detail the platform 74 which supports the mask 18 as well as the lens being tested. The platform 74 includes a fixed base 74a on which is fixedly mounted the mask 18. A turret 74b is threadably engaged with the base 74a by threads 75 and provides the reference plane 96. In the example of FIG. 10, the lens being tested is a contact lens 102 having a back vertex 103 corresponding to the vertex 98 described in FIG. 9. Thus, the mask 18 remains fixed with respect to the base 74a and, thereby, with respect to the lenses 80 and detecting plane 26 shown in FIG. 9, which also are fixed. However, by unscrewing or rotating the turret 74b, the reference plane 96 can be moved or raised in relation to the annulus 24 of the mask 18 for reasons now to be described.

As already mentioned, the lensmeter 48 can be used to determine the refractive properties of the lens such as contact lens 102. In addition, the raising of the reference plane 96 in relation to the annulus 24 permits an accurate measurement of the focal length of the contact lens 102. From equation (3) the strength D of lens 102 can be determined and from that the focal length $F=1/D$ can be calculated. As shown in FIG. 9, the distance m is measured assuming the back vertex 98 is fixed with reference to the plane 96. However, for contact lenses there is a wide variation in their internal radius such that the position of the back vertex 103 in relation to the reference plane 96 varies and therefore must be compensated for. This can simply be done by incorporating calibration marks on the periphery of the turret 74b that correspond to the radius of curvature of the particular contact lens 102 being measured. The calibration locations are easily calculated from the geometry of the platform 74, the radius of the contact lens 102 being measured and the pitch of the threads 75 of the platform 74. Although these corrections are minor, even for relatively strong test lenses, they do provide for higher accuracy.

If, for example, bifocals, trifocals and graduated or gradient spectacles are the test lenses 12 to be measured for their refractive properties, the diameter of the annulus 24 should be relatively small. This is to be able to receive refracted light from, for example, the trifocal region of a test lens that is very narrow. For example, the diameter of the annulus 24 can be 4 millimeters. With regard to the width $W_1$ of the annulus 24, as already discussed, consideration should be given to the diffraction characteristics of the annulus in selecting this width. An optimum width can be determined for every situation. As one example, for a length of projection L shown in FIG. 1 equal to 30 millimeters, a width $W_1$ of 140 microns would be satisfactory.

As discussed earlier, the system 10 of FIG. 1, while being simple, is functional. However, since the distance L should be shorter than the shortest positive focal length of the test lens 12 that might be measured, the diameter of the loop 28 at the detecting plane 26 still may become inconveniently small. By employing the additional lenses 80 in lensmeter 48, a practical embodiment is obtained that provides for considerable freedom in the design of the geometry and range or size of loops 28 at the detecting plane 26.

Figure 11:
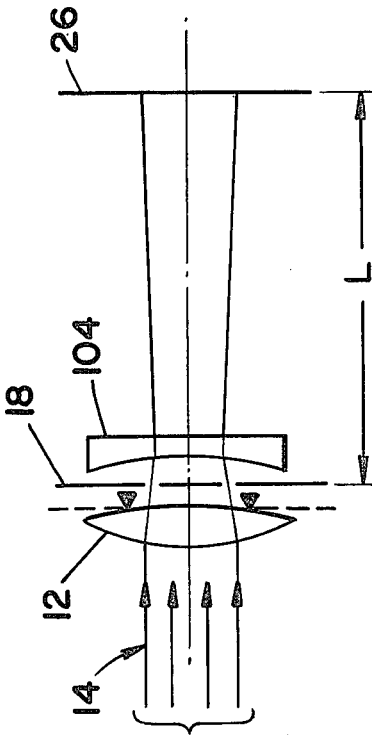
FIG. 11 is a schematic illustration of an alternative embodiment of the present invention.

FIG. 11 provides another simple embodiment that allows for larger loops 28 at the detecting plane 26 and for some freedom in the design of the geometry. Like reference numerals in FIG. 11 are used to indicate like components in FIG. 1. The collimated light beam 14 is propagated through a test lens 12. The refracted beam from lens 12 is then incident on the annulus 24. The refracted beam, which is converging as shown in FIG. 11, is then passed through a negative lens 104 which refracts the rays into a divergent beam. This negative lens 104 provides for a more practical and larger distance L as well as a larger size loop 28 at the detecting plane 26.

INDUSTRIAL APPLICABILITY

With reference to the lensmeter 48, the light source 52 and processor 86 are turned on, and the test lens 76a placed on the platform 74. The beam 66 is then refracted by the lens 76a and transmitted through the transparent material of the annulus 24 to provide the loop 28 at the detecting plane 26.

The process 86 will activate the detector electronics circuit 92 to scan the diode array 32 which is in one angular position at this time, and receive the detected data. After one scan, the processor 86 then activates the motor driver 88 to cause the stepper motor 93 to rotate the array 32 to another angular position. The processor 86 then again activates the detector electronics circuit 92 to scan the array 32 to obtain additional data of the loop 28. This process is repeated until a desired number of points of the loop 28 have been detected. The processor 86 will then have sufficient information upon which to calculate the refractive properties of the test lens 76a and provide a readout at display 94.

Other aspects, objects and advantages of this invention can be obtained from a study of the drawings, the disclosure and the appended claims.

I claim:

1. Apparatus (10) for determining the refractive properties of a test lens (12), the apparatus having a central axis (16), comprising:
   (a) means (14) for producing a nonrotatable beam of light about the central axis (16) and for directing the nonrotatable beam through the test lens (12) to refract the beam;
   (b) means (18) for generating a stationary loop (28) of light from the refracted beam, the loop having a shape, size and location dependent on the refractive properties of the test lens; and
   (c) means (31) for detecting the loop (28) of light at a plane (26).

2. Apparatus (10) according to claim 1 wherein said means (18) for generating includes means (24) for transmitting light of the refracted beam only at a predetermined radius $R_o$ from the central axis (16).

3. Apparatus (10) according to claim 1 wherein said means (18) for generating includes a mask having a field (20, 22) which is nontransparent to light and a circular annulus (24) which is transparent to light.

4. Apparatus (10) according to claim 3 wherein said annulus (24) has a predetermined width ($W_1$) to provide at the plane (26) a loop (28) of width ($W_2$).

5. Apparatus (10) according to claim 3 wherein said annulus (24) is at a predetermined radius $R_o$ from the central axis (16).

6. Apparatus (10) according to claim 3 wherein said mask is nonrotatable.

7. Apparatus (10) according to claim 1 wherein said means (31) for detecting includes a photodetector (32).

8. Apparatus (10) according to claim 7 wherein said photodetector (32) comprises a linear diode array.

9. Apparatus (10) according to claim 1 wherein said means (31) for detecting comprises:
   (a) a linear diode array (32); and
   (b) means (90) for rotating said diode array (32) about the central axis (16).

10. Apparatus (10) according to claim 1 wherein said means (31) for detecting comprises a plurality (36) of linear diode arrays, each being angularly spaced about the plane (26) and having one end in close proximity to the central axis (16).

11. Apparatus (10) according to claim 1 wherein said means (31) for detecting comprises a plurality (38) of linear diode arrays, one (38a) of said arrays extending across the central axis (16) and being of a length sufficient to intersect opposite points of the loop, the other (38b–38c) of said arrays being angularly spaced from the one array and having one end in close proximity to the central axis (16).

12. Apparatus (10) according to claim 1 wherein said means (18) for generating comprises a mask having a transparent circular annulus (24), and said means (31) for detecting comprises a photodetector (32), said photodetector (32) being positioned a distance L behind said mask, the distance L being shorter than the focal length of the test lens to be measured.

13. Apparatus (48) for determining the refractive properties of a test lens (76), the apparatus having a central axis (50), comprising:
    (a) means (52, 58, 62, 64, 68, 70, 72, 74) for producing a collimated, nonrotatable beam of light about the central axis (50) and for propagating the beam through the test lens (76) to refract the beam;
    (b) nonrotatable masking means (18) for generating a loop (28) of light from the refracted beam, the loop having a shape, size and location dependent on the refractive properties of the test lens (76); and
    (c) means (31) for detecting the loop (28) of light at a detecting plane (26).

14. Apparatus (48) according to claim 13 wherein said nonrotatable masking means (18) comprises a mask having an opaque field (20, 22) and a transparent circular annulus (24) at a predetermined radius (R) from the central axis (50), said circular annulus being of a predetermined width ($W_1$).

15. Apparatus (48) according to claim 14 wherein said radius ($R_o$) is approximately 2 millimeters.

16. Apparatus (48) according to claim 15 wherein said width ($W_1$) is approximately 140 microns.

17. Apparatus (48) according to claim 14 wherein said means (31) for detecting comprises:
    (a) a photodetector (32) at the detecting plane (26), and
    (b) lens means (78, 80) for propagating the refracted light beam from a reference plane (96) to the detecting plane (26), the test lens (76) being positionable at the reference plane (96) and said mask (18) being positioned between the reference plane (96) and the detecting plane (26).

18. Apparatus (48) according to claim 17 wherein said lens means (78, 80) comprises a pair (80) of lenses positioned between said mask (18) and said photodetector (32).

19. Apparatus (48) according to claim 18 wherein said lens means (78, 80) provides a ratio $$\frac{R}{R_o} = \frac{f_2}{f_1} + L\left( \frac{f_1 + f_2 - M}{f_1 f_2} - \frac{f_1}{f_2} \frac{1}{F - m} \right)$$

where R is the radius of the loop (28) from the central axis (50) at the detecting plane (26); $R_o$ is the radius of said circular annulus (24) from the central axis (50); m is the distance between the reference plane (96) and said mask (18); $f_1 = N_1$ where $f_1$ = focal length of one (80a) of said lenses and $N_1$ is the distance between said mask (18) and said one (80a) lens; M is the distance between said one (80a) and the other (80b) of said lenses; $f_2 = N_2$ where $f_2$ = focal length of said other (80b) lens and $N_2$ is the distance between said other (80b) lens and an imaging plane (100) at which said circular annulus (24) is imaged; and L is the distance between the imaging plane (100) and said photodetector (32).

20. Apparatus (48) according to claim 14 wherein said means (52, 58, 62, 64, 68, 70, 72, 74) for producing and for propagating comprises means (74) for holding the test lens (76) in the path of the collimated beam and for holding said mask (18) posterior to the test lens (76).

21. Apparatus (48) according to claim 20 wherein said means (74) for holding comprises:
    (a) a fixed stand (74a) mounting said mask 18; and
    (b) a movable stand (74b) providing a reference plane (96) at which the test lens (76) is mountable, said movable stand (74b) being movable to adjust the distance between said mask (18) and the reference plane (96).

22. Apparatus (48) according to claim 13 wherein said means (52, 58, 62, 64, 68, 70, 72, 74) for producing and for propagating comprises:
    (a) means (52, 58, 60) for providing a point source of light;
    (b) means (64, 68) for collimating and for filtering the light from said point source to produce the collimated light beam; and
    (c) means (70) for limiting the diameter of the collimated light beam.

23. Apparatus (48) according to claim 13 wherein said means (31) for detecting comprises:
    (a) a linear photodiode array (32) at the detecting plane (26); and
    (b) means (93) for rotating said array (32) about the central axis (50).

24. A method for determining the refractive characteristics of a test lens, comprising:
    (a) generating a nonrotatable collimated beam of light surrounding a central axis;
    (b) propagating the beam of light through the test lens to refract the light beam;
    (c) forming a stationary loop of light from the refracted beam at a plane, and
    (d) detecting a plurality of points of the loop at the plane.

25. A method according to claim 24 wherein the step of forming comprises propagating the refracted beam through a transparent circular annulus.

26. A method according to claim 25 wherein the step of propagating the refracted beam comprises maintaining the annulus stationary.

27. A method according to claim 26 wherein the step of detecting comprises detecting at least five points of light of the loop.

28. A method according to claim 27 wherein the step of detecting points of light comprises detecting pairs of points of light of the loop.

* * * * *

UNITED STATES PATENT AND TRADEMARK OFFICE
CERTIFICATE OF CORRECTION

PATENT NO. : 4,275,964
DATED : June 30, 1981
INVENTOR(S) : Arthur Vassiliadis

It is certified that error appears in the above—identified patent and that said Letters Patent is hereby corrected as shown below:

Column 10, line 68, after "of the" and before "(38b-38c)" it should read --loop, the others--.

Column 11, line 27, after "radius" and before "from the" cancel "(R)" and insert therefore --($R_o$)--.

Signed and Sealed this

Twenty-seventh Day of October 1981

[SEAL]

Attest:

GERALD J. MOSSINGHOFF
*Attesting Officer*     *Commissioner of Patents and Trademarks*